No. 833,402. PATENTED OCT. 16, 1906.
C. A. LINDSTRÖM.
STEEL CAR CONSTRUCTION.
APPLICATION FILED OCT. 14, 1905.

6 SHEETS—SHEET 1.

WITNESSES
INVENTOR

No. 833,402. PATENTED OCT. 16, 1906.
C. A. LINDSTRÖM.
STEEL CAR CONSTRUCTION.
APPLICATION FILED OCT. 14, 1905.

6 SHEETS—SHEET 2.

WITNESSES
INVENTOR

No. 833,402.

PATENTED OCT. 16, 1906.

C. A. LINDSTRÖM.
STEEL CAR CONSTRUCTION.
APPLICATION FILED OCT. 14, 1905.

6 SHEETS—SHEET 3.

No. 833,402. PATENTED OCT. 16, 1906.
C. A. LINDSTRÖM.
STEEL CAR CONSTRUCTION.
APPLICATION FILED OCT. 14, 1905.

6 SHEETS—SHEET 4.

WITNESSES
Warren W. Swartz
R A Balderson

INVENTOR
Charles A. Lindström
by Bakewell Byrnes
his attys

No. 833,402.  
PATENTED OCT. 16, 1906.  
C. A. LINDSTRÖM.  
STEEL CAR CONSTRUCTION.  
APPLICATION FILED OCT. 14, 1905.  
6 SHEETS—SHEET 5.
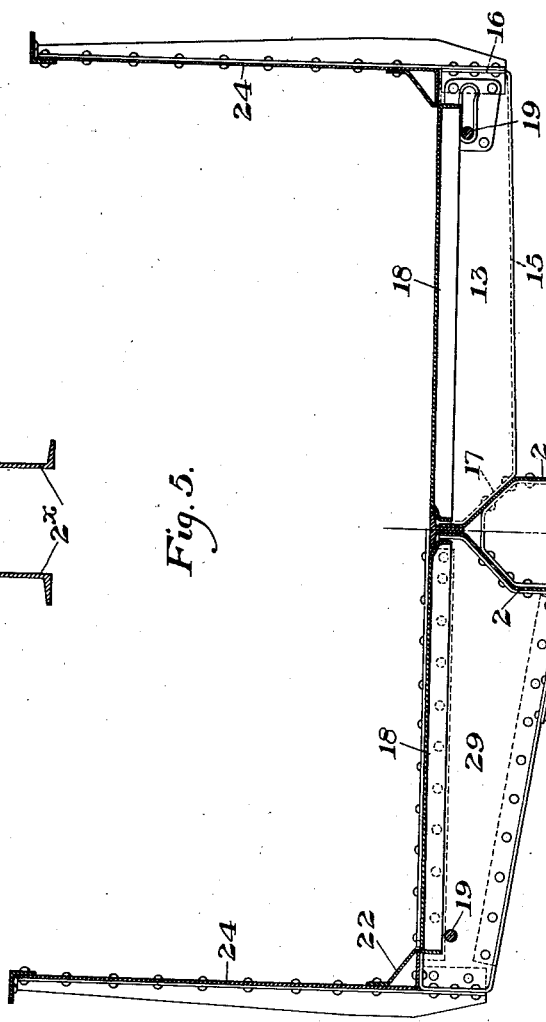
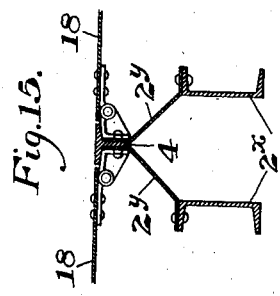
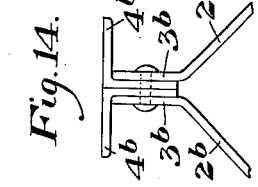
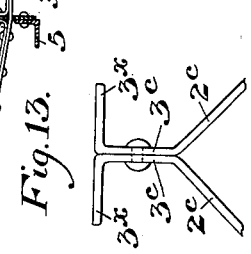
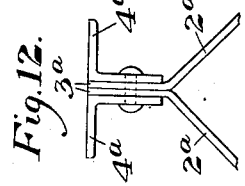
WITNESSES  
Warren W. Swartz  
R. A. Balderson.
INVENTOR  
Charles A. Lindström  
by Bakewell & Byrnes  
his attys

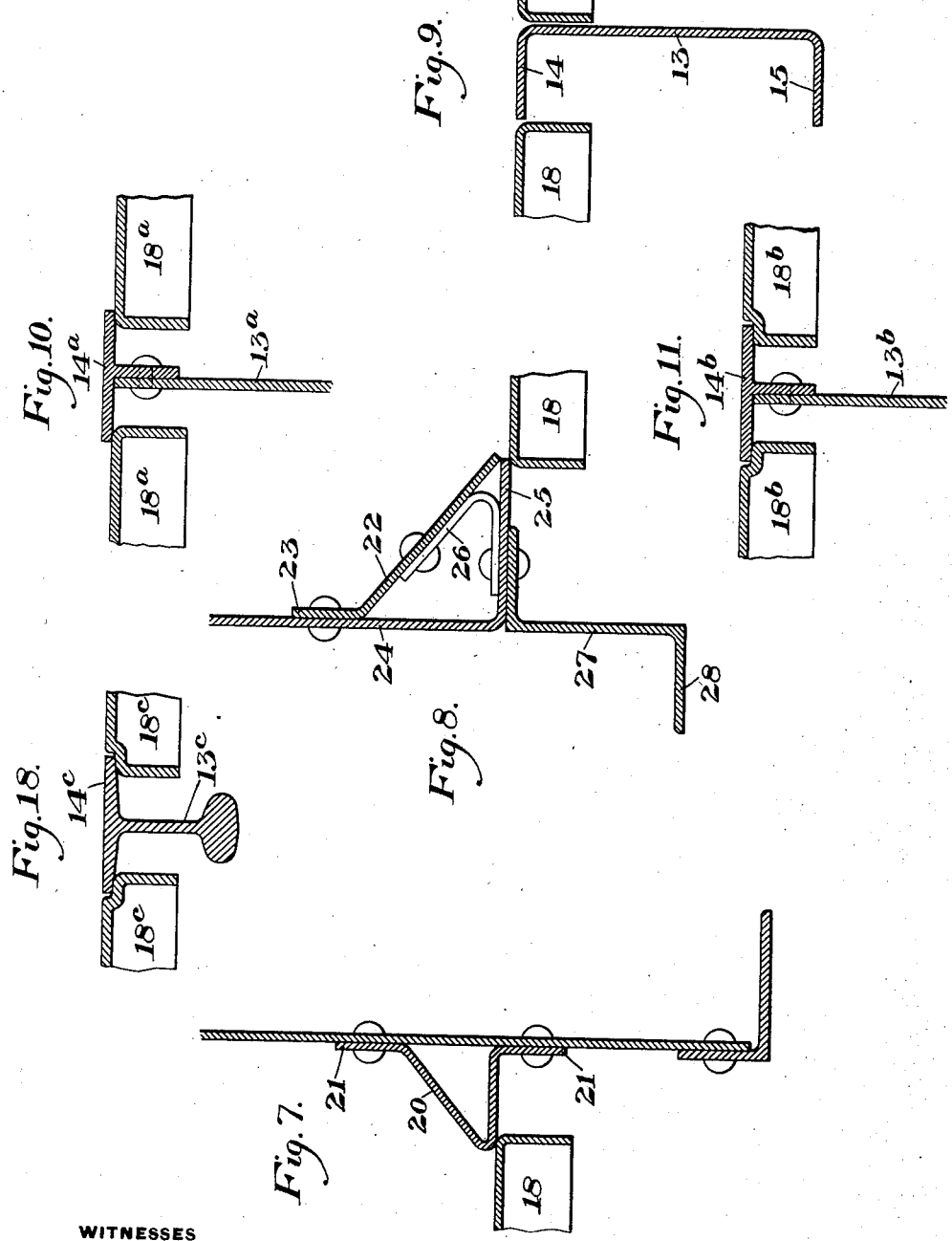

UNITED STATES PATENT OFFICE.

CHARLES A. LINDSTRÖM, OF ALLEGHENY, PENNSYLVANIA, ASSIGNOR TO PRESSED STEEL CAR COMPANY, OF PITTSBURG, PENNSYLVANIA, A CORPORATION OF NEW JERSEY.

STEEL-CAR CONSTRUCTION.

No. 833,402.     Specification of Letters Patent.     Patented Oct. 16, 1906.

Application filed October 14, 1905. Serial No. 282,754.

*To all whom it may concern:*

Be it known that I, CHARLES A. LINDSTRÖM, of Allegheny, in the county of Allegheny, Pennsylvania, have invented a new and useful Steel-Car Construction, of which the following is a full, clear, and exact description, reference being had to the accompanying drawings, forming part of this specification, in which—

Figure 1:
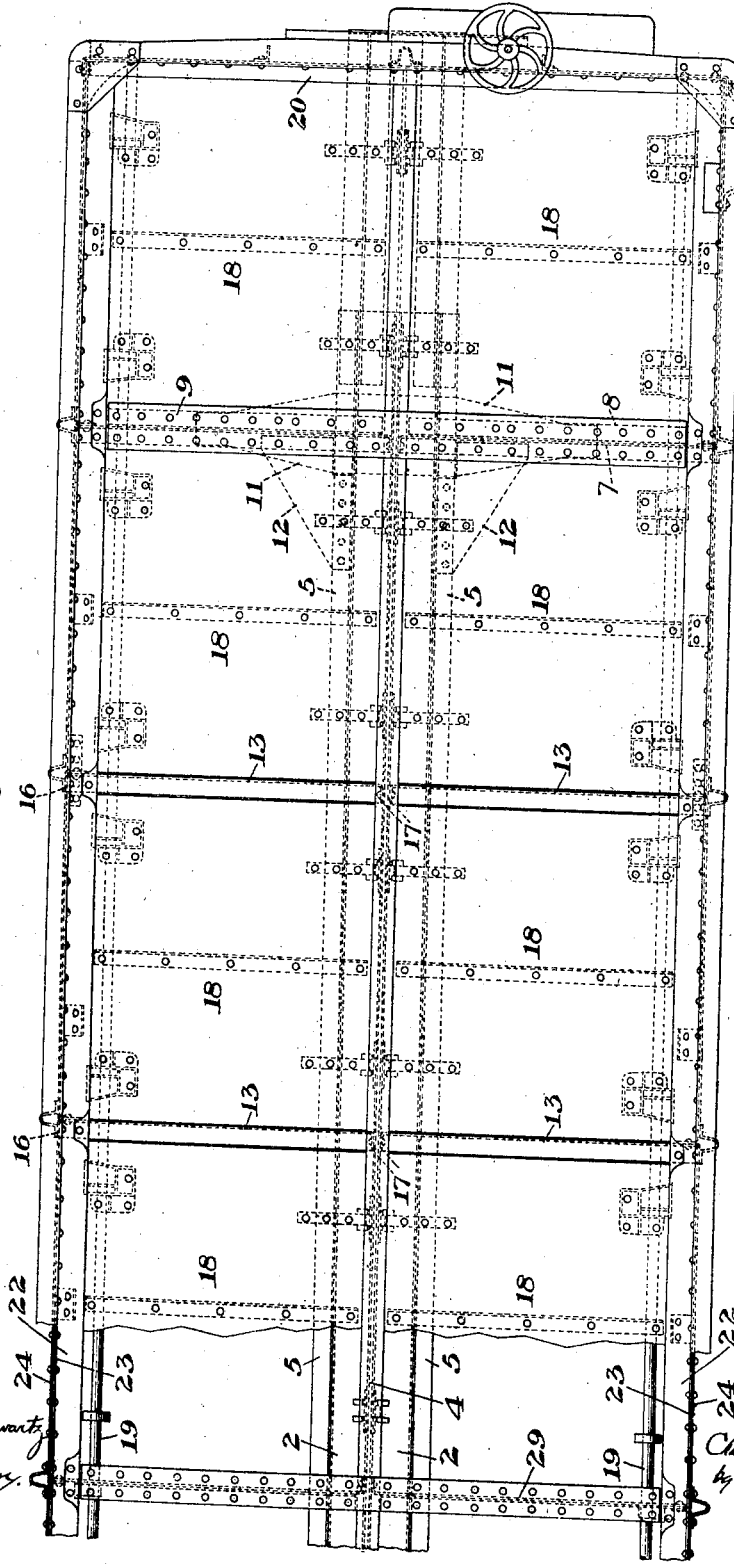
Figure 2:
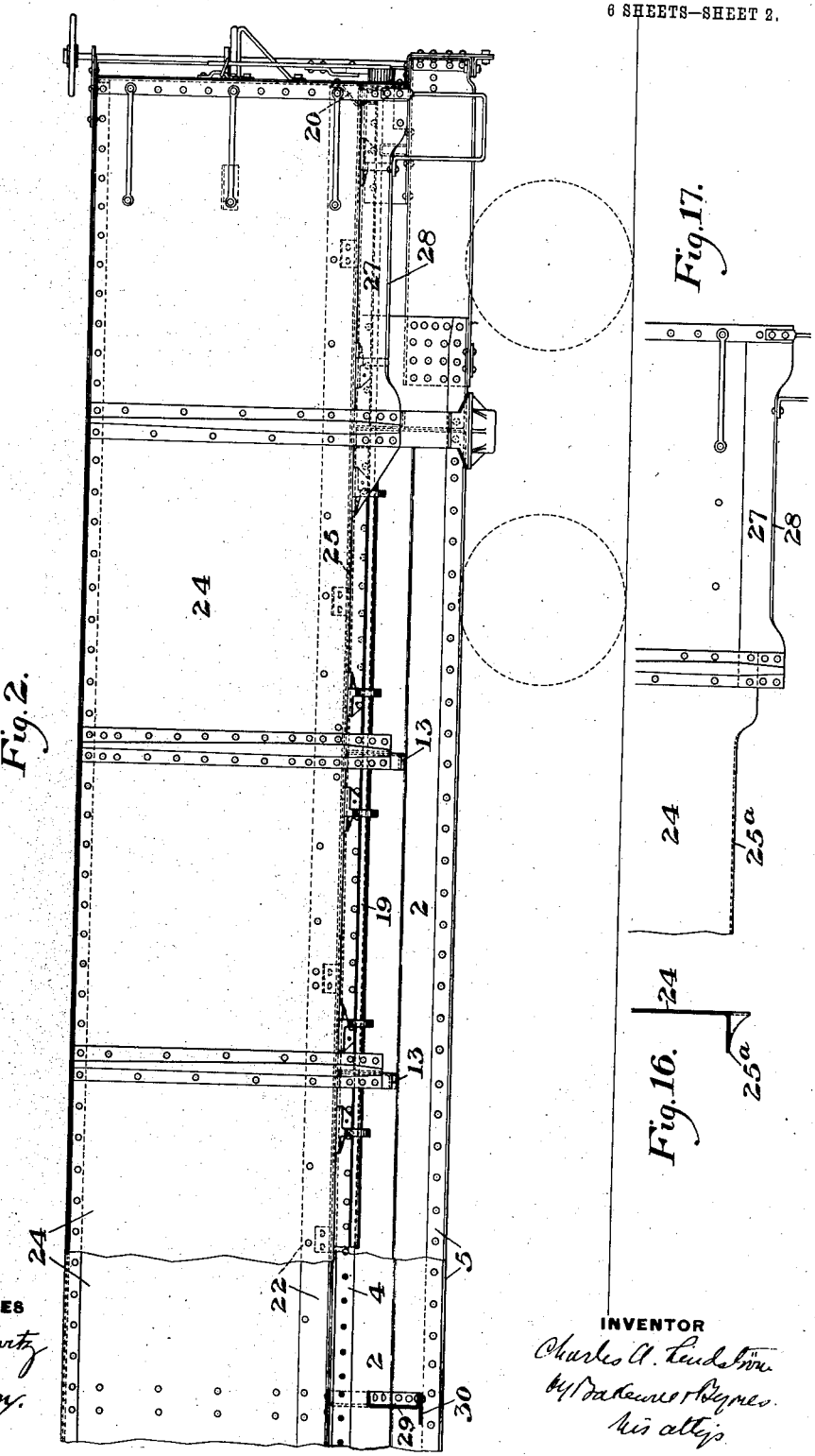
Figure 3:
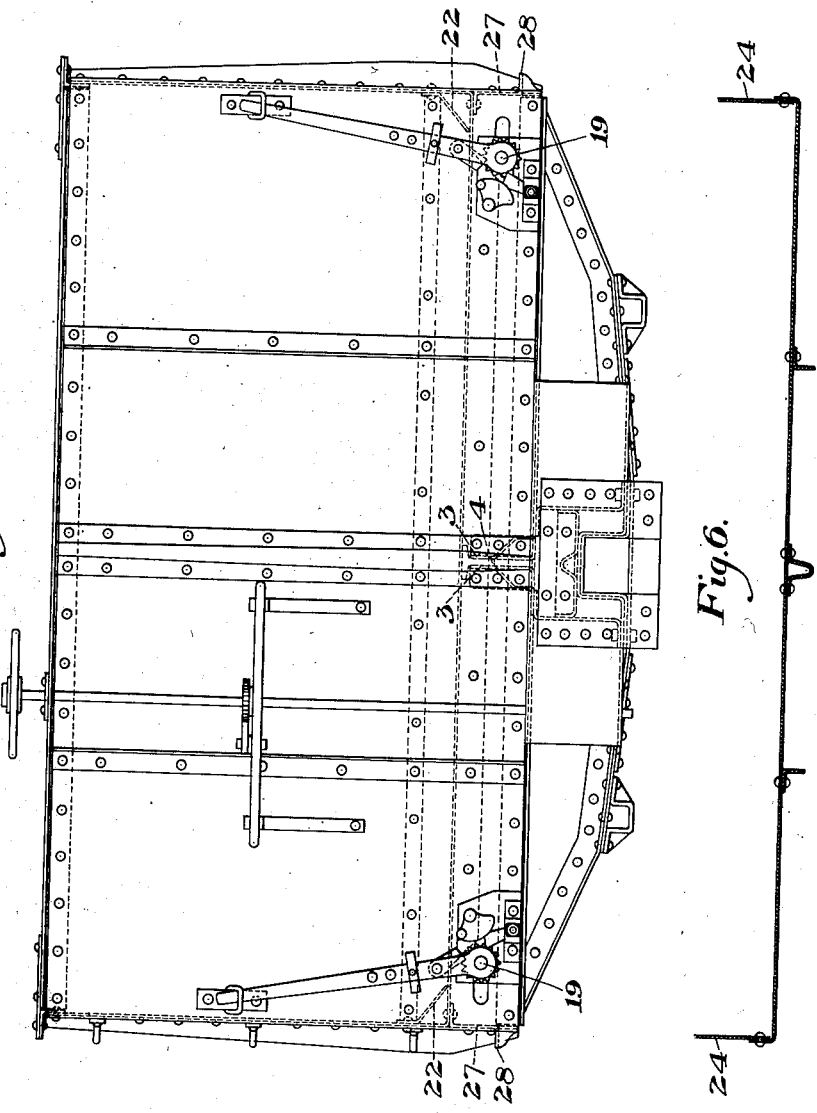
Figure 4:
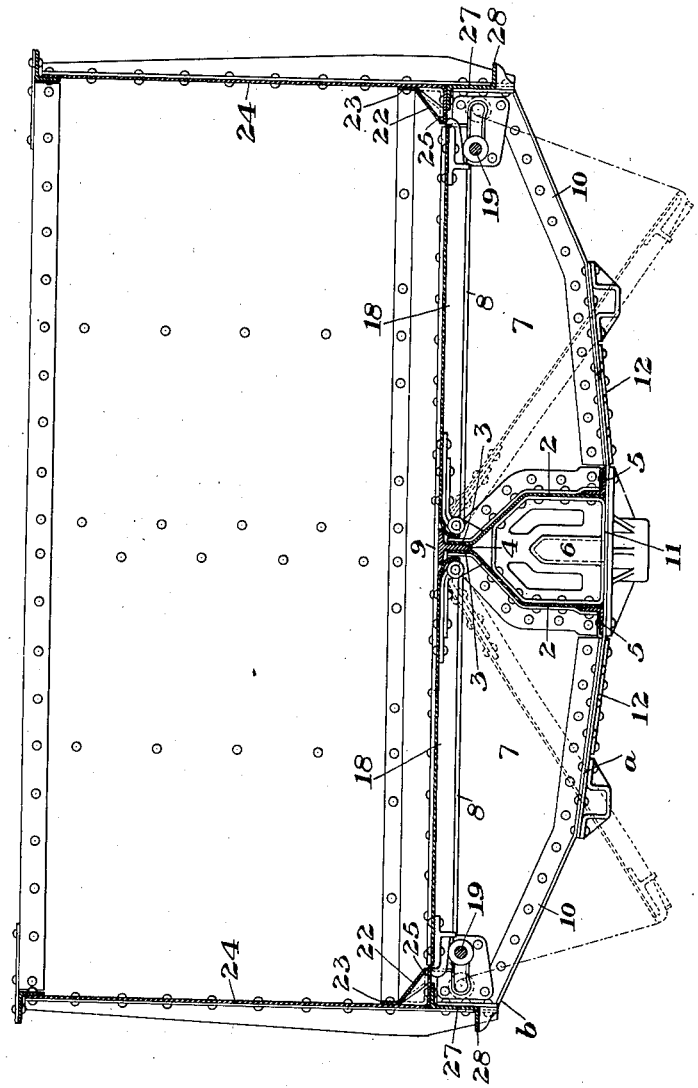

Figure 1 is a partial top plan view, partly broken away, of my improved structure. Fig. 2 is a partial side elevation. Fig. 3 is an end elevation. Fig. 4 is a cross-section near the bolster. Fig. 5 is a cross-section showing the two types of diaphragms or transoms between the doors. Fig. 6 is a cross-section of the end sheet. Figs. 7, 8, and 9 are enlarged detail views hereinafter referred to. Figs. 10 and 11 are modified forms of diaphragms. Figs. 12, 13, 14, and 15 show modified forms of center sills and ridge-beams. Figs. 16 and 17 show a modified form of side plate and flange. Fig. 18 shows another form of diaphragm.

My invention relates to the class of steel cars, and particularly gondola cars, having flat bottoms with doors constituting a part of and preferably nearly the whole of the floor.

The object of the invention is to increase the area of the doors in such a car and correspondingly decrease the percentage of the load retained in the car when the doors are lowered.

A further object of the invention is to raise up the floor above the usual height of the sills; to increase the opening stroke of the door under the car sides; to give greater angle to the doors when opened, so as to facilitate unloading; to prevent the material lodging along the corners at the ends and sides of the car near the floor-line; to decrease the width of the longitudinal center member or ridge-beam to which the doors are hinged, as compared with the width of the center sills proper; to form the bolsters with tops of less area than their bottoms, and also with a cross-section which decreases in area from the center toward the side of the car to allow for greater opening of the doors, and, further, to reduce the diaphragms between the doors to the smallest practical area, while stiffening and giving the proper strength to the car.

The invention also consists in the construction and arrangement of the parts, as more fully described, and set forth in the claims.

In the drawings, 2 2 represent the side members of the center sill, which consist of wide plates with their upper portions bent upwardly and inwardly at about the normal top level of the center sills and terminating in vertical parallel flanges 3 3, between which is held the vertical leg 4 of a T-iron ridge-beam. The upper surface of the T-iron gives a small area for lodgment of the lading, while its leg is riveted between the vertical flanges of the longitudinal sill members. Along the lower outer edges of the members 2 are riveted the angles 5 to give the proper stiffness to the lower edges of the plates. The longitudinal sill is further stiffened by fillers or spacing-plates 6 of any desirable form and number.

Instead of using two plates for the main sill members I may employ two channels $2^x$ of a height corresponding to the vertical portions of the plates, with flanged plates $2^y$ riveted to their upper edges and extending upwardly and inwardly to receive the ridge-beam, as shown in Fig. 15.

Instead of using a T-iron, as shown in Fig. 4, I may employ a pair of angles $4^a$, as shown in Fig. 12. In this form the extension-flanges $3^a$ contact with each other, and the angles are riveted to their outer faces. In Fig. 14 I show a similar form in which the angles $4^b$ are riveted between the flanges $3^b$. In Fig. 13 I show the flanges $3^a$ of the extension members as provided with bent extensions or flanges $3^x$, which take the place of the flanges of the T-iron or angles.

The bolsters are preferably built up of plates and angles, the plates 7 being preferably tapered from the center sill toward their outer ends and provided with pairs of angles 8, riveted along their upper edges, a strengthening-plate 9 being riveted over the two angles. The lower parts of the plates 7 are also provided with pairs of angles 10, a bottom plate 11 being used to tie the two parts of the bolster together. This bottom plate extends below the sill members 2 2 and is riveted to their angles. The shape of this plate is shown in dotted lines in Fig. 1, it being widest at the central portion and thence tapering to its outer portion, the tapered portions merging into a parallel edge portion at the point a, where it intersects the door in its open position. From the point a out to the end b of the plate, Fig. 4, the edges are preferably parallel to give clearance for the raising and lowering of the door, which is thus allowed to drop down farther than it would if the plate were of greater width through this portion of the bolster. The bolster may of course be constructed in many different ways, whether of castings, rolled or pressed shapes, or otherwise, the main features of my invention in this regard being the small area on its top as compared with its central bottom portion and the cutting down of the outer width of its bottom portion to allow greater opening of the doors.

The bolsters are preferably reinforced by the plates 12 12, which are of general triangular form and are riveted to the angles 5 and also to the angles 10 and the plate 11. Between the bolsters the car is provided with transverse diaphragms or transoms. These diaphragms may be enlarged or strengthened at or near the center of the car, and in the form shown they consist of a channel form 13, which is bent up from a plate and provided with upper and lower flanges 14 and 15. It may also be made of a rolled section, though I prefer to press it from a plate, as this provides end flanges 16 17 for riveting each diaphragm to the corresponding center-sill member and to the side stake or other side portion of the car. These flanges may be integral with the diaphragm or may be in the form of separate angles or bent plates secured thereto. The upper flange 14 of each diaphragm forms a part of the flat floor of the car, being flush with the tops of the doors 18. These doors may be hinged in any desirable manner and may swing either transversely or longitudinally of the car. I have shown them as hinged at or near the ridge-pole above the center sills, swinging downwardly and inwardly to discharge the load toward the sides. I have also shown a creeping-shaft device 19, such as shown in Patent No. 791,348, granted to myself and J. F. Streib, for operating the doors. The doors may, however, be raised and lowered by the use of any desirable mechanism.

In Fig. 10 I show a diaphragm consisting of the plate 13$^a$, having a T-iron 14$^a$ riveted along its upper edge, the doors 18$^a$ abutting against it. In Fig. 11 I show a similar form, except that the doors 18$^b$ are provided with recesses for the flanges of the T-bar 14$^b$, thus making them more nearly flush with the floor, and in Fig. 18 I show the diaphragm as consisting of a bulb-beam or deck-beam 13$^c$, having upper flanges 14$^c$. In all these forms the doors are substantially flush with the top of the diaphragm under the meaning of my claims.

The end doors have their side edges short of the end sheet of the car, and the space between is filled by a plate 20, of triangular cross-section, having flanges 21, which are riveted to the end sheet. The edge of the door contacts with this triangular filler, which sheds off the lading and also serves to stiffen and strengthen the end of the car-body. This plate 20 extends horizontally across the entire width of the inside of the body ends.

In order to shed the lading along the corners of the sides over the operating-shafts which are below the floor, I provide the angular plate 22, which extends along the length of the side and has a flange 23 riveted to the side sheets. The side sheets 24 are flanged inwardly at their bottom, as shown at 25, to meet the lower edge of the plate 22, and bent braces 26 are secured in the triangular space between the flange and the plate. The longitudinal edges of the doors 18 contact with the edge of the flange portion 25, so that the bent plate 22 discharges the load down through the door-openings. Instead of using an integral flange 25 on the side sheet I may rivet an angle to the side sheet to afford the inwardly-extending flange, or the flange 25$^a$ may be bent inwardly in a horizontal direction between the stakes, with the side sheets extending downwardly at the stakes, as in Figs. 16 and 17. In the form shown a strengthening Z-bar 27 is also riveted to the integral flange 25 of the side plate, these Z-bars extending only from the end of the car to, at, or near the bolster-point. In the space between the bolsters the Z-bars are done away with to increase door-openings.

The Z-bars 27 preferably extend from the end of the car inwardly slightly beyond the bolster-points, and their lower flanges 28 are bent down or flattened out into the plane of the web near the ends, these flattened portions being riveted to the bolster-angles, forming a support for the downwardly-extending side stake. The Z-bar is also flattened at its outer end for securing to the corner-angle between the side and end plates. This Z-bar may be formed of a rolled shape with the end portions of the flanges flattened or bent into the web, or it may be made of a sheared plate with the intermediate portion bent up to form the oppositely-extending flanges, the object being to get stiffness and strength to the corner of the car, while at the same time allowing ample door-opening.

The majority of the diaphragms have preferably the depth shown at the right-hand portion of Fig. 5. If a larger diaphragm or diaphragms are used at or near the center of the car, (shown at 29 in Fig. 1,) this diaphragm is preferably deepened, as shown at the left of Fig. 5, so as to include a part of the vertical web of the center-sill member, and thus give the proper depth for transmitting strains from the sides to the center sills or from the center sill to the sides. This larger diaphragm may be formed in any desirable shape, as of a pressed plate with integral flanges, a built-up structure, or casting. It may be of such depth that the bottom plate 30 may extend below the angles 5 of the center sill instead of through the plates above them, as shown in Fig. 5.

The advantages of my invention consist, first, in the small area of the stationary flooring, which is as small as it can be practicably made with safety. The decreasing of the area of the upper face of the bolsters as compared to the lower face contributes to this result, as does also the introduction of a narrow ridge-beam above the center sills proper as compared with the with of the center sills. The upper flanges of the cross-diaphragms are as small as they can be properly made for strength and form a part of the stationary floor, doing away with added floor-plates secured to the diaphragms. By raising the height of the floor above the longitudinal center sills and bending their upper portions inwardly toward each other I obtain a strong construction, while giving the smallest possible amount of stationary flooring to cover it. At the same time by raising the fulcrum of the door I obtain a better angle for the doors when in their open position to discharge the lading. The Z-bar shapes at the corners of the car give a strong stiff construction, while at the same time allowing the proper amount of door-opening.

Instead of making the center sills continuous and securing the bolsters thereto the bolsters may be made continuous across the transverse section of the car and the sills made in sections secured to the bolsters. The center sills may also extend through the bolsters for a short distance and be riveted to the projecting parts or interfit in any other desired manner. While I prefer in most forms to form the floor entirely of door-openings, part of the floors may be made solid—as, for example, at the ends, which may be flat or sloping, as required in any particular case. In such case only that part above the center sills between the bolster should be made as shown, which corresponds to the car-bottom having the doors. Of course where the floor is solid the construction may be of any ordinary desirable form.

Many other changes may be made in the form and arrangement of the various parts without departing from my invention.

I claim—

1. A car having longitudinal center sills extending the entire length of the car-body and having an upper surface of less width than its lower surface, the upper member of the sill being of T form; substantially as described.

2. A car having a longitudinal center sill whose upper surface is flat and is substantially flush with and forms a part of the car-bottom, and which is of less width than its lower surface, the upper portion of the sill being in the form of a T; substantially as described.

3. A car having a longitudinal center sill extending the entire length of the car-body and having an upper surface of less width than its lower surface, and a T-iron having its web secured between the upper flanges of the longitudinal sill members; substantially as described.

4. A car having a longitudinal center sill whose upper surface is of less width than its lower surface, the upper portion of the sill being in the form of a T having a depending flange or flanges secured to the upper portion of the lower member of the sill and whose upper surface is substantially flush with and forms a part of the bottom of the car; substantially as described.

5. In a flat-bottom gondola car having bottom doors, a longitudinal center sill below the car-floors, formed of two members consisting each of a lower horizontal flange, a lower vertical web portion, an upper inclined portion below the inner edge portions of the doors and permitting movement thereof, and an upper vertical portion to receive the door-hinges, and an independent top flange or flanges secured to said members and having its upper surface substantially flush with the surfaces of the doors; substantially as described.

6. A flat-bottom gondola car having a longitudinal center sill formed of two metal members, each of which has a horizontal flange at its lower edge, and a web which is vertical at its upper and lower portions and is inclined at its intermediate portion, together with a top member secured to said members and having a flat upper surface substantially flush with the car-floor; substantially as described.

7. A car having a longitudinal sill with an upper surface of less width than its bottom, bolsters having upper surfaces of less width than their bottoms, and downwardly-opening doors whose upper surfaces are substantially flush with the upper surfaces of both the sills and the bolsters; substantially as described.

8. A steel car having at the end a filler-plate formed by upper and lower portions parallel with and secured to the end sheet of the car, and an intermediate inwardly-bent portion having an upper inclined shedding-surface; substantially as described.

9. A steel car having a Z-shaped member secured to the sides at the corners and having parts of its lower flanges projecting downwardly; substantially as described.

10. A steel car having Z-shaped members extending from the end along the side to or slightly beyond the bolster with outwardly-projecting flanges and flattened end portions secured to the side structure of the car; substantially as described.

11. A flat-bottom car having a narrow longitudinal stationary central floor member in the form of a T connected to and extending above the center sill proper, and having its upper surface substantially flush with the floor of the car, doors hinged below said member and extending along each side thereof, the upper surfaces of said doors when closed being substantially flush with the surface of said member, the lower edges of the car sides being elevated sufficiently above the center sill proper to enable the outer ends of the doors to be lowered to the proper angle for discharging the load; substantially as described.

12. A car having a longitudinal center sill with a raised portion above its normal height, the upper member of the sill forming such raised portion being in the form of a T and acting as a support for the doors its upper surface being in the plane of and forming the floor-surface between the doors; substantially as described.

In testimony whereof I have hereunto set my hand.

CHARLES A. LINDSTRÖM.

Witnesses:
K. L. ROBINSON,
HARRY B. FISHER.